Patented Nov. 19, 1929

1,735,925

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

PROCESS OF PRODUCING REDUCTION PRODUCTS OF CARBON DIOXIDE

No Drawing. Original application filed August 28, 1925, Serial No. 53,203. Divided and this application filed March 9, 1928. Serial No. 260,553.

This invention relates to the process of preparing reduction products of carbon dioxide.

More particularly, the invention relates to the catalytic reduction of carbon dioxide in the presence of hydrogen or hydrogen containing gases and of catalysts.

Carbon dioxide has been reduced catalytically in the past but the reduction has always been carried out as a single step both with regard to the mechanical installation and the chemical catalysts and other factors affecting the reaction.

I have found that the reduction of carbon dioxide takes place mainly in stages according to the following reactions:

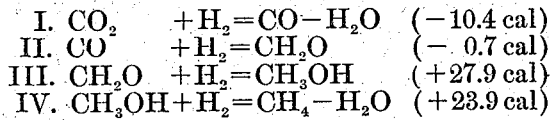

I. $CO_2 + H_2 = CO - H_2O$ $(-10.4 \text{ cal})$
II. $CO + H_2 = CH_2O$ $(- 0.7 \text{ cal})$
III. $CH_2O + H_2 = CH_3OH$ $(+27.9 \text{ cal})$
IV. $CH_3OH + H_2 = CH_4 - H_2O$ $(+23.9 \text{ cal})$ All of the stage reactions are dimolecular reactions and proceed more rapidly than do reactions of higher orders involving a larger number of molecules, provided the initial reaction speeds are comparable.

Direct reduction in a single reaction to produce formaldehyde, methyl alcohol or methane, involve reactions of higher orders which proceed very slowly.

It is one of the features of the present invention that each stage is carried out in the presence of catalysts and under the influence of heat, pressure or electric discharges which are best suited to give a maximum conversion for each stage. It is thus possible to carry out the reduction at all times under the optimum conditions producing a maximum of the desired products with a minimum of side reactions. For example, such side reactions may produce higher alcohols, ketones, acids, hydrocarbons, oils and precipitation of carbon through decomposition of the products formed.

The present invention is directed to the production of methane, the reaction going through the stages referred to above.

Stage I, as can be seen from the inspection of the reaction, consists in a reduction and splitting off of water and takes place without change in volume, and is endothermic. Owing to the fact that there is no change in volume, pressure is not necessary but I have found that moderate pressures do not exert any deleterious effect and the first stage can be carried out with or without increased pressure. Pressure within limits even has the advantage that a larger number of gas molecules come in contact with a given amount of catalysts when the gas speeds are the same. The absolute yield of carbon monoxide from a given amount of catalyst is, therefore, greater than when low pressures are used. It should be understood, however, that the invention is not limited to the use of any particular pressure in Stage I.

I have further found that when the reaction is carried out in the presence of suitable catalysts at temperatures ranging from 200 to 450° C. and under pressure, large amounts of CO can be produced even with very high gas speeds. It is one of the advantages of the present invention that the first stage can be carried out with extremely high gas speeds which result in a greatly enhanced production per unit. The temperature range is not critical, but I have found that it is not advantageous to exceed the upper limit, as the catalysts then tend to fail and may also result in the production of methane, particularly with high pressures.

The catalysts for the first stage should consist of reduction catalysts and dehydration catalysts as the reaction is not a pure reduction, but also includes splitting off of water. Reduction catalysts, for the purpose of this invention, may be divided into two classes, those which I term "strong" reduction catalysts, namely, iron, nickel, cobalt and palladium, and "mild" reduction catalysts, such as copper, silver, lead, cadmium, zinc, magnesium, manganese, tin, gold and platinum.

In the case of zinc, however, I find that the presence of elemental zinc in the form of zinc dust is very desirable in reduction catalysts for any of the first three stages and I consider the use of zinc in the form of zinc dust to be one of the features of my invention. The elements may be present as elements or in the form of oxides, easily decomposable salts, especially complex salts or other compounds.

For the first stage, only mild reduction catalysts should be used and the strong reduction catalysts should be avoided except in very great dilution and in connection with very high gas speeds. The strong reduction catalysts, particularly under pressure, tend to cause the reaction to proceed too rapidly and unless they are in very great dilutions, not more than 3%, large amounts of methane are formed and there is a tendency to precipitate carbon. Converters or converter tubes should not be made of alloys containing iron, nickel or cobalt, unless they are lined with other materials. I have found that linings of mild reduction catalysts, such as copper and the like, are particularly advantageous.

The dehydration or reduction catalysts which may be used include thorium, aluminum, titanium, zirconium, chromium, silicon, tungsten, beryllium, zinc, uranium, molybdenum and vanadium. The dehydration catalysts should preferably be in the form of their oxides or their hydroxides or may be in the form of salts, simple or complex, or other compounds. The best results are produced when the mild reduction catalysts and the dehydration catalysts are combined or mixed together and various combinations of single catalysts or mixtures of catalysts may be used.

The converter may be charged by filling in a mixture of the two catalysts, for example, in the form of layers or by making granules or fragments molded from pulverized reduction and dehydration catalysts. One or more of the catalysts of one type may be used as carriers for the other type, or vice versa.

When using the catalysts described above, the reaction is carried out practically to a state of equilibrium even at enormous gas speeds which may be from 50 to 200 times the volume of the converter per hour. The proportions of the reaction gases may be varied and I have found that it is advantageous to use an excess of hydrogen or hydrogen containing gases, but the invention is not limited to a particular proportion. An excess of hydrogen does not cause any side reaction such as the formation of hydrocarbons, ketones, acids, oils and the like. As a result of the particular nature of the catalysts, the reaction does not go beyond the stage of producing carbon monoxide in excellent yield, even though an excess of hydrogen is used.

After the end of the first phase, the gas may be freed from water, if desired, and further reduced according to the reaction of Stage II. Unless an excess of hydrogen was used in the beginning, additional hydrogen will be necessary and may be directly added to the gas stream with or without separating out the water.

Stage II is a slightly endothermic reaction which proceeds with the reduction in volume and improved yields are produced by the use of pressure, although pressure is not essential to the reaction. Increased temperature should be used but should not be too high and 400 to 450° C. represents about the upper practical limit when working under pressure or without pressure. Above this temperature, formaldehyde is decomposed and particularly when high pressure is used, the catalysts tend to cause the production of methane with a large loss of useful gases and destruction of the formaldehyde. The pressure and temperature are dependent factors and should not be varied without reference to each other.

The catalysts to be used in Stage II are mild reduction catalysts and strong reduction catalysts should be avoided except in exceedingly high dilutions. It is important not only to prevent the presence of strong reduction catalysts in any considerable amount in the converter or in the converter chamber at the beginning of the reaction, but care should be taken to prevent the introduction of strong reduction catalysts in the form of dust or volatile compounds in the gas stream. It is also important to avoid the presence of catalyst poisons, such as sulphur, arsenic, volatile phosphorus compounds and the like, both in the gases used in Stage I, and also in the additional hydrogen containing gases which are added to the product of Stage I before carrying out Stage II. A similar precaution should be taken to prevent the introduction of catalyst poisons when adding fresh gases to the reaction mixture in further stages.

I have found that it is not only necessary to avoid strong reduction catalysts in the reaction of Stage II, but it is necessary to damp the action even of mild reduction catalysts in order to prevent the reaction from becoming uncontrollable. I have found that this damping can best be brought about by incorporating an excess of catalysts having an opposite function, namely, oxidation catalysts.

The following oxidation catalytic elements may be used:—chromium, vanadium, manganese, titanium, molybdenum, tungsten, cerium, thorium, uranium and zirconium. The elements may be present in the form of oxides, salts, both simple and complex, and other compounds and are preferably in the form of their oxides or of chemical combinations of the various oxides, such as, for example chromates, vanadates, etc.

The mixture of mild reduction catalysts and oxidation catalysts may be simultaneously charged into the converter either in the form of layers or granules containing the above catalysts and formed by molding the powdered ingredients. Finally, one type of catalyst may be used as a carrier for the other type of catalysts or both may be impregnated in inert carriers, particularly porous carriers which increase the catalytic surface and which may also possess catalytic power due to their large surface extent. I have found that carriers containing colloidal silicious material, such as kieselguhr, colloidal silica, coke, charcoal, artificially prepared carbons, earthenware fragments, calcine porcelain, pumice, powdered quartz and the like are particularly suitable and appear not only to act as porous materials increasing the catalytic surface, but also are positive activators. Single catalysts or mixtures of catalysts can be used.

I have found that kieselguhr, colloidal silicic acid and porous carriers and surface catalysts such as pumice, earthenware, quartz, powdered glass and similar compounds when in an exceedingly finely divided state so that the average particle size is not greater than about $20\mu\mu$, have a most extraordinary effect when used as carriers for the catalysts proper, particularly when they are impregnated with solutions of complex salts of the catalytic compounds and are formed into granules with suitable cementing material. This type of carrier is effective in all of the stages and I am of the opinion that the remarkable increase in effectiveness of the catalysts impregnated on the finely divided carriers is due to the fact that the surface energy of the contact masses increases the pressure of the gas in the immediate vicinity of the catalyst surface and thus greatly aids in the efficiency of the reaction. The above theory has, of course, not been rigorously proven and I do not desire to limit the present invention to any theory of action but advance the above opinion as the most probable explanation of the efficiency of this feature of the present invention.

The reaction is a slightly endothermic one and is preferably carried out with high gas speeds to remove the unstable formaldehyde as fast as possible from the catalytic zone. By arranging the catalyst in zones or layers of increasing catalytic activity in the direction of the gas flow, the most active catalysts come in contact with partly spent gases and the least active catalysts contact with the fresh gases. In this way, a more complete conversion is achieved.

The increase of catalytic activity may be brought about in various ways. Reduction catalysts of increasing specific catalytic activity may be used. The same result can be achieved by increasing the relative concentration of the reduction catalysts which may, for example, be brought about by varying the proportions of oxidation and reduction catalysts. Thus, the first layers will contain a large excess of oxidation catalysts and then a smaller and smaller excess. The two methods, above mentioned, may also be combined to achieve the same result.

The pressures used may be varied over a wide range, but I have found that the highest percentage of pure formaldehyde is produced at about 10 atmospheres or lower. The temperature should be prevented from becoming too high and I consider 200 to 390° C. to be the optimum temperature range for use in connection with damped mild reduction catalysts. Where small amounts of strong reduction catalysts are present, the temperature should not exceed 220° C.

The gas speed should be kept high in order to rapidly remove formaldehyde from the catalytic zone since this compound is relatively unstable and easily tends to become decomposed. The formaldehyde can be recovered by sudden cooling and exposure to water which can advantageously be carried out by means of a water stream. Repeated cooling of the reaction gases even when the formaldehyde is not separated is advantageous in order to prevent decomposition of this product by low pressure.

Stage II can be carried out in a separate converter from Stage I and the catalysts arranged in zones. I have found that it is advantageous where a single converter is used to alternate the zones, as the reduction of carbon monoxide, formed in the first stage, upsets the equilibrium and on further contact with additional layers of catalysts, adapted to favor the first stage and further amounts of carbon dioxide can be reduced. It is also possible to mix the catalysts for the two stages. In either event, a progressively increasing catalytic activity, such as has been defined above, is advantageous in order to increase the yield.

Where separate converters are used and Stage I is carried out under a moderately low pressure, the converters can be advantageously connected with various stages of a single multi-stage compressor, the carbon dioxide and hydrogen containing gases being compressed in the lowest stage, fed into the converter of Stage I and the reaction gases together with additional hydrogen, if necessary, compressed to a higher pressure into a further compressor stage. Circulating pumps for each stage may also be used and are of advantage in permitting a very much greater gas speed with a satisfactory completeness of reaction. High gas speeds are advantageous and permit higher yields per unit time.

The gases from Stage II without separation of the formaldehyde are then further reduced to methyl alcohol according to the reaction of Stage III. This third stage is a strongly exothermic reaction which takes place with reduction of volume. I have found that pressure is favorable, and, in general, the pressure should be higher in Stage III than in Stage II, although this is not an essential feature of the invention, and the two stages may be carried out at the same pressure if this proves desirable.

The temperature should not exceed 420 to 450° for practical purposes, and preferably temperatures between 250 and 390° C. should be used. Higher or lower temperatures, however, can be used with somewhat less advantage. The pressure can be increased practically without limit, other than the expense of installation of high pressure apparatus.

The catalysts to be used consist, as in the second stage, of a mixture of reduction and oxidation catalysts, but instead of using an excess of oxidation catalysts, an excess of mild reduction catalysts should be used. Strong reduction catalysts should be avoided or used in very great dilution and the same precautions against the introduction of gas borne strong catalysts should be taken as in Stage II. Catalysts can be arranged as described in connection with Stage II in zones and may be of any of the forms described above. Preferably the catalysts are impregnated upon finely divided carriers having particles of colloidal size or a capillary structure (kieselguhr) as has been described above. The other types of catalyst carriers, may, however, be used and mixtures of catalysts impregnated on colloidal carriers and those mounted on more massive carriers may be used. The activity of the catalysts should preferably be increased in the direction of the gas flow, either by using catalysts of increasing catalytic activity, or by progressively increasing the catalyst concentration, or by a combination of the above methods. The reaction, which is strongly exothermic is benefited by the increase in activity of catalysts in the same way as in Stage II and undesired side reactions which may be caused by local overheating of the catalysts are avoided.

Separate converters may be used for each of the three stages or two or more stages may be carried out in a single converter. Where a single converter is used, alternation of the catalyst zones may advantageously be employed in order to carry the reactions more nearly to completion by a constant upsetting of the equilibrium. Where all three stages are carried out in a single converter, the advantages accruing from the association of Stages I and II with the third stage are remarkable. The advantage of carrying out Stages I, II and III in a single converter, particularly with alternating catalytic zones, consists in the fact that the heat given off during the exothermic reaction of Stage III supplies the heat required to carry out the endothermic reactions of Stages I and II with a corresponding saving in heat and a very efficient cooling of the reaction in Stage III. In this manner, local overheating is avoided and an improved yield produced with a minimum of side reactions.

Where separate converters are used, the pressure in Stage III may be as high as is practicable with the converter construction used and for best results should be around 200 atmospheres. A multi-stage compressor connected to the different converters may advantageously be used in order to step up the pressure for each stage and this can be effectively combined with addition of fresh gases between stages. A further advantage lies in the fact that the fresh gases may be used to increase the pressure without causing a marked diminution in volume of the converter used in Stage II. It is also advantageous where Stage III is carried out in a separate converter to cool the exhaust gas from Stage II as sudden cooling prevents decomposition of the formaldehyde formed.

Where all three stages are carried out in a single converter or where Stage II and Stage III are carried out in the same converter, the pressure may tend to be somewhat less than where a separate converter is used in Stage III in order to retain the efficiency of the earlier stages.

Where all three stages are carried out in the same converter, the gas speed can advantageously be increased markedly since formaldehyde is much less stable than methyl alcohol and should be rapidly transferred from the zone where the reaction of Stage II is carried out to the zone where the reaction of Stage III takes place in order to prevent decomposition of formaldehyde. It is thus possible to use higher pressures and temperatures than would be efficient in a separate formaldehyde converter. Carrying out the reactions of Stages II and III in the same converter has also the advantage that a higher pressure which is used in order to bring about the maximum conversion in Stage III is of advantage in preventing or diminishing the decomposition of formaldehyde at high temperatures since the decomposition of formaldehyde results in an increase in volume and this reaction is opposed by high pressures.

Where a single converter for the three stages is used, the original gas mixture should contain sufficient hydrogen for the three reactions.

Stage IV is a strongly exothermic reaction and takes place without change of volume. Two reaction phases are really present,—reduction and dehydration or splitting off of water. Accordingly, as in Stage I, I have found it advantageous to use a mixture of reduction and dehydration catalysts. Instead, however, of using mild reduction catalysts, I use strong reduction catalysts associated with dehydration catalysts. Pressure is not necessary to the reaction, but I have found that it does no harm and where a separate converter is used for Stage IV, the pressure used may vary within wide limits and is dictated largely by convenience. As in the case of the mild reduction catalysts, the strong reduction catalysts may be present in the form of elements of their oxides, salts, both simple and complex, or other compounds. The converter, itself, may advantageously be constructed of a metal containing one or more of the strong reduction catalysts or may be lined with a lining containing them.

The mixture of strong reduction catalysts and dehydration catalysts may be similar to the mixtures used in the other stages, i. e., separate catalysts may be used or one type, of course, may serve as a carrier for the other type or porous carriers which are inert or of relatively minor catalytic power may be used. Part or all of the reduction and dehydration catalysts of mixtures may be advantageously prepared by impregnating kieselguhr and colloidal carriers as has been described above. Catalysts which are prepared in this way are highly effective and constitute the preferred form.

The catalysts should be arranged to form zones of increasing catalytic activity in the direction of the gas flow for the same reason stated below in connection with the other stages. The increase of catalytic power should be both of the reduction and the dehydration catalysts as these two types cooperate with each other and do not oppose each other as is the case in the mixtures of reduction and oxidation catalysts used in Stages II and III. The increase in catalytic power, either by using catalysts of progressively greater catalytic activity or by progressively increasing the concentration or both, is of even greater importance in the Stage IV, as the reaction is strongly exothermic and the tendency toward local overheating of the catalyst with resulting danger to the converter and production of undesired side reactions, for example, deposition of carbon, is more likely to take place.

Gases from Stage III without removal of methyl alcohol therefrom, may be mixed with further quantities of hydrogen and passed through the methane converter at 200 to 500° C. or even higher. In cases of very low amounts of carbon dioxide in the exhaust gases from Stage III, additional carbon dioxide or even water gas may be added and high yields of methane may be produced.

All four stages may be carried out in separate converters with or without the addition of hydrogen containing gases between the stages and with or without cooling and separation of intermediate products and may practically be carried out in a single multi-stage compressor, the various converters being connected to different stages so that a different pressure can be used in each stage. Circulating pumps may also be used in one or more of the stages. Gas circulation may also be effected by a compressor by alternate compression and expansion as is well known in the art.

It is preferable to combine all four stages into a single converter where the end product desired is methane. The catalysts for each of the four stages may be arranged in zones or progressive or alternating or they may be mixed together. The arrangement in alternating zones not only permits a more complete reaction in each stage, but also aids in the cooling, as the heat of reaction given off in Stages III and IV, is partly used to supply the heat necessary in Stages I and II. Where a single converter is used for all four stages, the production of catalyst zones of increasing catalytic activity in the direction of the gas flow is of even greater importance than in single stages, as the resulting increase is very large when all four stages are carried out in a single converter, and there is a corresponding greater tendency to local overheating of the catalyst and production of undesired side reactions. High gas speeds are very desirable.

The presence of nitrogen, methane, rare gases of the air, and even small amounts of oxygen do not seriously affect the reaction, either where the separate stages are carried out in separate converters or where a plurality of stages are carried out in single converters. A moderate carbon-monoxide content and the presence of moderate amounts of water vapor also have no harmful effect.

The control of reaction heat, particularly in Stages III and IV, is especially important in connection with the use of extremely high gas speeds since within limits the faster the gas flow, the greater the net heat evolution. Moreover, the evolution of heat is largely in a thin catalytic surface and the present invention which carries out only a single stage reaction in contact with a particular catalyst, prevents damage to the catalyst and permits enormous gas speeds with correspondingly larger yields.

The converters may be heated electrically either externally or internally depending on the converter material but where internal heating is used in the first three stages, the heating elements should be free from strong reduction catalysts. The converters may also be heated by coils, preferably lined with copper on the outside, through which mercury, water under pressure or other liquid, may be circulated. The use of coils presents the further advantage that they can be used either as heating or cooling means.

*Example 1*

A copper converter is charged with a catalyst consisting of 100 parts pure copper carbonate on 1000 parts thorium oxide fragments, the copper carbonate being stuck on with dextrin and reduced at 280° C. in a stream of hydrogen. Alkali or alkali metal silicate or silicon dioxide may also be included in the catalyst and act partly as an activator and partly as cements. A gas mixture about 6% nitrogen, 2% methane, 47% carbon dioxide and 45% hydrogen and free from catalyst poisons is passed through the converter at about 350 to 380° C. at a speed of about 80 to 180 converter volume per hour. The exhaust gases contain carbon monoxide, carbon dioxide and water in proportions which correspond almost to the equilibrium fixed. Gases are then sent through a heat exchange chamber, cooled down and compressed in a compressor together with sufficient fresh hydrogen to bring the hydrogen content of the carbon monoxide containing gases to about 70%. After compression to about 5 to 7 atmospheres, the gases are heated in a heat exchanger and passed through a second converter at about 210° C. The contact layer in this second converter consists of pumice fragments about the size of beans, coated with a paste 100 parts of vanadic acid, 100 parts manganese carbonate, 50 parts kieselguhr, 50 parts ammoniacal silver nitrate, 30 parts cadmium nitrate, and 0.75 parts colloidal platinum, sufficient water and dextrin being present to cause good adhesion. The coating should not be too thick in order to prevent flaking off. Before using, the contact mass is reduced with hydrogen at a temperature of 250° C. The size of this second converter, which can advantageously be made of copper, should be so chosen that the amount of gas passing through per hour is about 80 to 180 times the converter volume.

The hot gases containing formaldehyde from the converter, after cooling down rapidly, are compressed to 80 to 100 atmospheres in the medium and high pressure stages of the same compressor and an additional compressor forces in sufficient hydrogen so that the hydrogen content of the formaldehyde containing gases is 75% or more.

Gases are then passed through a heat exchanger and into a third converter consisting in a high pressure cylinder, lined with copper, aluminum or zinc and charged with a catalyst. The temperature should be about 300° C. The catalyst consists in 300 parts of pure calcined kieselguhr and 20 parts of silica gel which are mixed with 100 parts of zinc dust. The mixture is then formed into paste with a solution containing 140 parts of copper oxide in the form of ammoniacal copper oxide solution, 45 parts of zinc in the form of ammoniacal zinc oxide in solution, 60 parts of chromium oxide in the form of the acetate and 5 parts of vanadic acid in the form of ammonium vanadate. The paste is dried until it can be molded into granules which are then further dried at 150° C. and reduced with hydrogen at 250° C.

The gases passing through the converter should possess highest possible speed consistent with maintaining them above 200° C. The exhaust gases are entirely or partly cooled by heat exchanger and cooler, partly under pressure, and a good yield of methyl alcohol results. The hot gases containing methyl alcohol are then lowered in pressure to 3 or 4 atmospheres or atmospheric pressure and are passed first through a heat exchanger and then through a fourth converter at about 300° C. The converter contains a catalyst formed of 120 parts of nickel formate and 90 parts of water glass paste on aluminum granules. A good yield of more or less pure methane is produced.

Example 2

100 parts of copper oxide fragments are soaked with a solution containing ammoniacal silver nitrate, corresponding to 20 parts $Ag_2O$. The mass is evaporated and the product then treated with a solution of 10 parts of aluminum acetate and again evaporated. The fragments are then reduced with hydrogen at 250 to 350° C.

A rapid current of gases containing 58% carbon dioxide, 38% hydrogen, 2% carbon monoxide, 1.5% nitrogen and 0.5% oxygen and free from catalyst poisons, is rapidly passed over the catalyst at 250 to 350° C. The exhaust gases which contain a large amount of carbon monoxide are cooled and compressed to 100 atmospheres or more with considerable additions of hydrogen to prevent liquefaction of carbon dioxide in the compressor. Advantageously, the gases may contain a concentration of hydrogen of about 75% after the addition of fresh hydrogen and are then passed through a second converter capable of withstanding high pressures and provided with a lining free from iron. Hydrogen concentrations lower or greater than 75% do not harm.

The converter is charged with catalyst layers about 5 centimeters thick and having the following constitution:

(1) A layer of 100 parts of aluminum oxide free from iron impregnated with 5 parts of copper and 5 parts of silver in the form of readily decomposable salts.

(2) A layer of 15 parts cadmium oxide, 5 parts lead nitrate, 60 parts of zinc dust and 20 parts of manganese oxide, the mixture being formed into granules with about 5% of dextrin.

(3) A layer containing 100 parts of thorium oxide fragments, impregnated with 10 parts copper and 10 parts zinc in the form of complex ammoniacal nitrates.

(4) A layer containing 40 parts of zinc dust mixed with 10 parts of vanadium oxide in form of ammonium vanadate solution, is activated with 15 parts of colloidal silica and the whole mixture formed into granules with an ammoniacal zinc oxide solution containing 15 parts of zinc oxide.

(5) A layer containing 15 parts of $Cr_2O_3$ in the form of chromium acetate and 50 parts of zinc dust, the mixture having been thickened, calcined and broken into fragments.

(6) A double layer consisting in a mixture of 140 parts copper oxide in the form of ammoniacal copper oxide and 150 parts of zinc, half in the form of zinc dust and half in the form of ammoniacal zinc oxide. To these reduction catalysts, 80 parts of chromic acid, 80 parts of manganese dioxide are added as oxidation catalysts and 45 parts calcined kieselguhr and 15 parts of colloidal silica are added as activators, the whole mixture being thickened and formed into granules and calcined.

(7) A layer of methane catalyst such as that described in Example 1.

The contact layers described above are reduced with hydrogen at 250° C. before use. The layers are in alternate zones for the production for formaldehyde and methyl alcohol with the exception of layer (7) and the zones become progressively more active in the direction of gas flow. The gases pass through the converter at high speed and the exhaust gases contain large amounts of methane which can be recovered as in Example 1.

It will be seen that the invention consists in a novel and improved method of preparing reduction products from carbon dioxide, characterized by the reduction in stages in the presence of catalysts and under conditions of pressure and temperature best suited for each stage reaction.

In the claims, the expressions "mild reduction catalysts", "strong reduction catalysts", "oxidation catalysts" and "dehydration catalysts" should be understood to cover those catalysts described in the specification.

In the claims the expression "extremely high gas speeds" is intended to cover such speeds as are described in the specification; i. e. from 80 to 180 times the converter volume per hour and upwards.

This application is a division of my co-pending application Serial No. 53,203, filed August 28, 1925.

What is claimed as new is:

1. A method of reducing carbon dioxide to methane, which comprises causing it to react with hydrogen containing gases in stages forming, successively carbon monoxide, formaldehyde, methyl alcohol and methane, without isolation of the intermediate stage products.

2. A method according to claim 1 in which extremely high gas speeds are used.

3. A method according to claim 1 in which the first stage is carried out in the presence of contact masses containing mild reduction and dehydration catalysts.

4. A method according to claim 1 in which the second stage is carried out in the presence of mild reduction catalysts having their action damped by oxidation catalysts.

5. A method according to claim 1 in which the second stage is carried out in the presence of mild reduction catalysts damped by oxidation catalysts in quantity greater than the quantity of mild reduction catalysts present.

6. A method according to claim 1 in which the third stage is carried out in the presence of mild reduction catalysts damped with oxidation catalysts.

7. A method according to claim 1 in which the third stage is carried out in the presence of mild reduction catalysts damped with oxidation catalysts, the mild reduction catalysts being in excess over the oxidation catalysts.

8. A method according to claim 1 in which at least one of the first three stages is carried out in the presence of mild reduction catalysts, and the fourth stage is carried out in the presence of strong reduction catalysts.

9. A method according to claim 1 in which all of the reactions take place in a single converter.

10. A method according to claim 1 in which at least one of the first three stages takes place in the presence of mild reduction catalysts, and the reaction gases are substantially free from gas borne strong reduction catalysts.

11. A method according to claim 1 in which at least one of the first three stages is carried out in the presence of mild reduction catalysts, and the portions of the converting apparatus used in which the first three stages take place are free from strong reduction catalysts.

12. A method according to claim 1 in which at least one of the second or third stages is carried out in the presence of a contact mass containing a mixture of oxidation and mild reduction catalysts, one being a carrier for the other.

13. A method according to claim 1 in which the fourth stage is carried out in the presence of strong reduction catalysts admixed with dehydration catalysts.

14. A method according to claim 1 in which at least one of the first three stages is carried out in the presence of mild reduction catalysts, and the fourth stage is carried out in the presence of strong reduction catalysts admixed with dehydration catalysts.

15. A method according to claim 1 in which at least the second and third of the first three stages are carried out in the presence of mild reduction catalysts, and the fourth stage is carried out in the presence of strong reduction catalysts.

16. A method according to claim 1 in which at least the second and third of the first three stages are carried out in the presence of mild reduction catalysts, and the fourth stage is carried out in the presence of strong reduction catalysts admixed with dehydration catalysts.

17. A method according to claim 1 in which the second and third of the first three stages are carried out in the presence of mild reduction catalysts admixed with oxidation catalysts, and the fourth stage is carried out in the presence of strong reduction catalysts.

18. A method according to claim 1 in which the second and third of the first three stages are carried out in the presence of mild reduction catalysts admixed with oxidation catalysts, and the fourth stage is carried out in the presence of strong reduction catalysts admixed with dehydration catalysts.

Signed at Pittsburgh, Pennsylvania, this 8th day of March, 1928.

ALPHONS O. JAEGER.